Jan. 25, 1966     D. E. BLOXSOM, JR., ETAL     3,230,764
METHOD OF DETERMINING HEAT TRANSFER RATES
AND TEMPERATURE CONDITIONS
Filed June 14, 1963

DANIEL E. BLOXSOM, JR.
BARRY V. RHODES
              INVENTORS.

BY

ATTORNEYS

United States Patent Office 3,230,764
Patented Jan. 25, 1966

3,230,764
METHOD OF DETERMINING HEAT TRANSFER RATES AND TEMPERATURE CONDITIONS
Daniel E. Bloxsom, Jr., 523 S. Lucerne, Los Angeles 5, Calif., and Barry V. Rhodes, 22358 Baltar St., Canoga Park, Calif.
Filed June 14, 1963, Ser. No. 287,969
9 Claims. (Cl. 73—147)

The present invention relates to temperature and heat transfer measurement techniques and more particularly to a unique technique for determining heat transfer rates and surface temperature conditions in an extremely brief interval of time measured in milliseconds according to one mode of use and in seconds or longer according to another mode of use.

Present day technology has many needs for determining heat transfer rates over both plain and compoundly curved surface areas to a high degree of accuracy and reliability and under conditions which may remain stable or reasonably so only for an instant or other brief interval of time. The design of spacecraft traveling at super and hypersonic velocities through media of constantly varying density, temperature, viscosity and other characteristics necessitate the provision of new and improved means for determining temperature and heat transfer values with reliability using a bare minimum of physical equipment. The problem is further complicated by the fact that certain available laboratory techniques for simulating high velocity flight conditions with requisite precision have an operating cycle of a duration restricted to one or a few milliseconds.

Prior proposals advanced in attempts to deal with the problem have been of two general types. One employs high sensitivity temperature sensors usually of the thermocouple type having a minute junction located as close as is feasible to the surface of the area under test. Each sensor requires electrical connections to delicate and complex readout equipment. The preparation of models having such sensors embedded therein as well as the sensor equipment itself is costly and time-consuming. Furthermore, when using this technique it is impractical to mount more than a limited number of sensors in a given model. Numerous other problems are also involved well known to those skilled in this art.

The second of the known techniques has serious limitations involving the use of special compositions on the surface of the model and having the characteristic of changing their appearance when heated. A wide variety of such compositions have been proposed but these have the serious disadvantage that each particular composition is responsive to a narrow critical temperature range and is ineffective as respects temperatures to either side of this critical range. Accordingly, such compositions are substantially valueless except in a very limited number of applications as, for example, in manufacturing quality control situations where it suffices to ascertain whether or not a particular temperature was reached during a particular manufacturing operation.

With the foregoing problems and limitations of the prior art in mind, it is a primary object of the present invention to provide a greatly improved technique and procedure for determining heat transfer rates and surface temperatures obviating the short-comings and disadvantages of prior proposals and requiring the presence of no instrumentation or equipment on the test device proper other than a film-thin coating of the sensor material. The heat sensitive film to which reference is had is transparent comprising a material having the property of changing its refractive index when its exterior surface is exposed to a source of heat with the change in refractive properties occurring progressively from the exposed surface inwardly as a function of the temperature of the heat source and the duration of exposure. If the duration of exposure and the temperature of the source are accurately known and controlled, then it remains but to measure precisely the depth of the change in refractive index.

Two quite different readout techniques can be employed to measure the depth of the interface between the layer having a changed refractive index and the underlying material having an unchanged refractive index. In the case of relatively long duration tests exhibiting a substantial depth of the interface readily observed by the aided or unaided eye, precision measuring equipment of either a mechanical or optical nature can be utilized to measure the thickness of the layer having a changed refractive index.

When using the present invention to determine heat rates and surface temperatures under test cycles of extremely short duration, as a millisecond, a quite different readout technique is employed utilizing the distinctive colors characteristic of very precise film thicknesses as determined by the interference on the one hand and the reinforcement on the other hand of incident light reflected respectively from the outer face and the inner face of the portion of the film having a changed refractive index. Desirably, but not necessarily, the tests are conducted with a model in association with a calibrated sphere of related size exposed to the same conditions as the model and each coated with the same heat-sensitive layer. The reason for using the sphere is that it can be easily calibrated to a high degree of accuracy. Color values of concentric ring areas on the model can then be compared with identical color characteristics on the calibrated sphere thereby greatly simplifying the readout procedure. Accurate identification of the particular spectral order lines is also facilitated using a calibrated sphere along with the model when conducting the test cycle.

It is therefore a primary object of the present invention to provide a new and improved technique for determining heat transfer rates at various points on a given surface configuration when exposed to a source of heat.

Another object of the invention is the provision of a technique for sensing temperature conditions on the surface of an object exposed to a heat source without need for instrumentation associated with the surface sensing the heat or need for alteration of the object undergoing test.

Another object of the invention is the creation of an improved, highly reliable method of determining the quantity and distribution of heat inwardly from the surface of an object subject to the dissipation of heat thereon by reason of relative flow conditions between a fluid medium and the object.

Another object of the invention is the provision of a heat sensor distributed over a surface subjected to the generation of heat energy and having the property, upon being exposed to heat, of changing its refractive index progressively in a direction away from the heat source with the change advancing as a function of the intensity of the heat source and the duration of exposure thereto.

Another object of the invention is the provision of a technique for determining the distribution of heat generated by relative movement of a slipstream of fluid with respect to the object and involving coating the object with a transparent layer of sensor material having the property of changing its light refractive characteristics inwardly away from the surface thereof exposed to heat energy and including a technique for accurately measuring the thickness of the layer having a changed refractive index.

These and other more specific objects will appear upon reading the following specification and claims and upon considering in connection therewith the attached drawing to which they relate.

Referring now to the drawing in which a preferred embodiment of the invention is illustrated:

Figure 3:
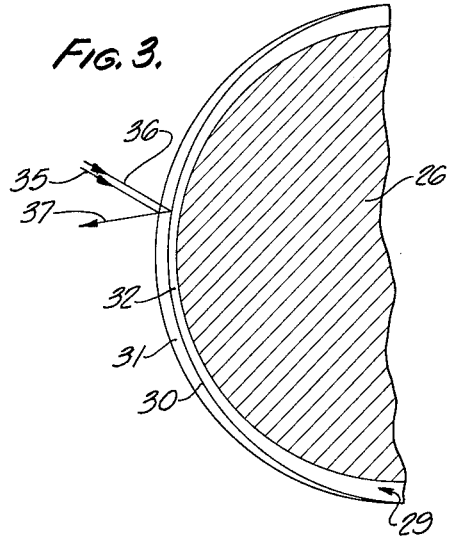
Figure 4:
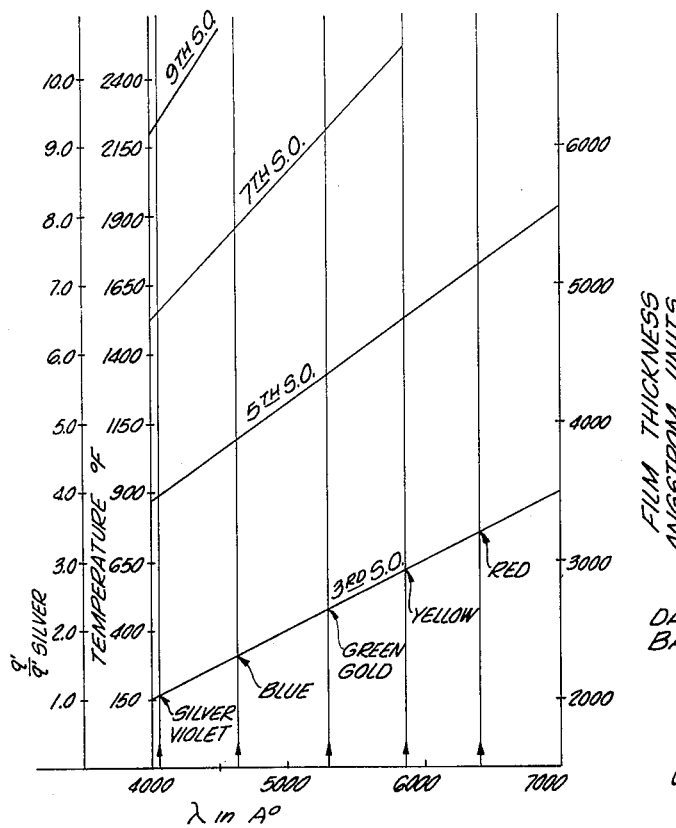

FIGURE 3 is a fragmentary view on an enlarged scale through a calibration sphere coated with heat sensor material and showing the thickness of components of this sensor coating on a greatly magnified scale; and FIGURE 4 is a readout chart from which colors observed on the surface of the heat sensor coating can be quickly compared with heat transfer rates, temperatures and the related thickness of the modified portion of the sensor film.

Figure 1:
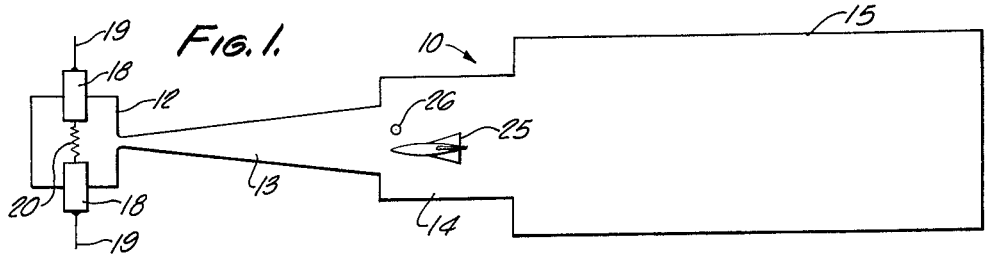
FIGURE 1 is a diagrammatic representation of a hypersonic wind tunnel in readiness for a test run.

Referring more particularly to FIGURE 1, there is diagrammatically represented a hypersonic wind tunnel designated generally 10 useful in practicing the present invention and particularly that aspect thereof wherein the object undergoing test is subjected to substantially an instantaneous pulse of heat and relative fluid flow.

A wind tunnel of this type is disclosed in our United States Letters Patent No. 2,995,035, granted August 8, 1961. Accordingly, only a brief description of its principal constituents need be set forth here. Tunnel 10 includes, as principal components, a heater chamber 12, a high-speed flow nozzle 13 opening therefrom, a test chamber 14 opening into the discharge end of this nozzle and communicating on its opposite side with a relatively large expansion chamber 15. The latter is preferably provided with suitable high-efficiency evacuating equipment, not shown, by which all portions of the tunnel except chamber 12 can be evacuated preparatory to making a test cycle.

Heating chamber 12 has very thick walls and its opposed sides are provided with insulators 18, 18 encircling electrodes to which lead wires 19, 19 are connected. The inner ends of the electrodes are interconnected by a fine fusible wire 20 commmonly known as a "teaser," and suitably provided by a bare length of No. 35 copper wire.

It will be understood that the lead wires 19, 19 are adapted to be energized by a bank of high-capacity capacitors charged to a desired level prior to beginning a test cycle. The inlet to nozzle 13 is initially closed by a fracture diaphragm of known type designed to rupture at a predetermined pressure condition within heating chamber 12 without risk of releasing any debris into the high velocity air stream entering nozzle 13. If desired, and preferably, heating chamber 12 is initially charged with air or other suitable fluid medium, as helium, under suitable pressure such as several hundred p.s.i. All other portions of the wind tunnel are evacuated after the test model 25 and a calibration sphere 26 suitable have been coated with the sensor material and suspended by fine wires in test chamber 14 at the outlet end of nozzle 13.

Figure 2:
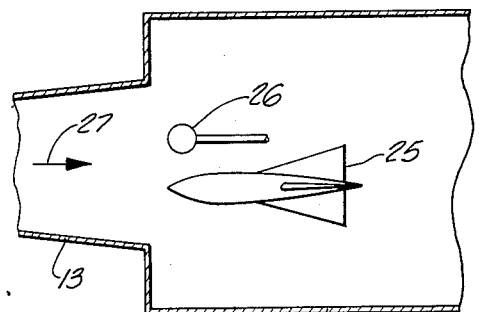
FIGURE 2 is a fragmentary showing of the test chamber proper of the hypersonic wind tunnel on an enlarged scale.

All being in readiness, the operator then closes the main switch to discharge the energy stored in the capacitor bank through the load provided by teaser 20. This heavy current flow fuses the teaser and heats the air trapped within chamber 12 to several thousand degrees while simultaneously increasing the air pressure to a high value. This fractures the frangible diaphragm and releases the hot high pressure air for high velocity flow through nozzle 13, past model 25 and sphere 26 and into expansion chamber 15. The surfaces of these two objects are thereby subjected to the hot hypersonic velocity flow represented by arrow 27 in FIGURE 2 and to an instantaneous pulse of a known quantity of heat represented in part by the sensible heat of the air and in part by the heat of friction generated as this air passes over the surfaces of the test objects.

Prior to being placed in test chamber 14 model 25 and sphere 26 are evenly coated with the heat sensor material indicated generally as a layer of exaggerated thickness 29 on the surface of sphere 26 in FIG. 3. It is essential that this coating be transparent and capable of instantly changing its refractive index upon exposure to a heat source. Various transparent plastics are found to exhibit this critical property and to be highly satisfactory as, for example, methyl methacrylate, Plexiglas, polyethylene, lacquers, and various acrylic plastic compositions. It is also highly desirable that the surface of the sphere and of the test object have an underlying surface of high-efficiency light absorbing characteristics so that it is virtually nonreflecting. This may be provided by a spray of a jet black pigment as carbon black and an adherent vehicle. The carbon black in a finely divided state may also be mixed with a liquid composition of the heat sensing plastic and then sprayed or otherwise applied to the surface of the objects undergoing test. Although the pigment is initially dispersed throughout the liquid coating as applied, it is found in practice that the pigment stratifies near the surface of the object leaving an outer transparent layer of plastic of sufficient thickness to conduct precision heat transfer tests. Either method of applying the heat sensor materials is found to provide quite satisfactory results. An outer film of clear plastic not in excess of one mil thick is found to be quite sufficient when utilizing a hypersonic wind tunnel of the type described above and operated for a pulse cycle of approximately one millisecond duration. Normally the thickness of clear outer film is appreciably thicker to provide assurance of an adequate film free of pigment. The maximum thickness of the film experiencing a change in its refractive index during test cycles of a millisecond is approximately 0.01 mil, the thickest portion of the changed film on surfaces normal to the axis of nozzle 13 and facing toward the entrance end of the nozzle. Portions of the film lying at angles of 50 degrees or more to the flow axis exhibit only slight if any change in the refractive index.

The interface representing the parameter between the outer film 31 having a changed refractive index and the immediate adjacent underlying layer 32 not affected by the heat is indicated at 30 in FIGURE 3.

Following completion of a test cycle conducted as described above, the object 25 under test and calibrated sphere 26 are removed from the wind tunnel and subjected to optical inspection. It will be observed that the surface of the sphere has colored concentric rings encircling the point on its surface coincident with the axis of nozzle 13. These colored rings are in hues not unlike those observed when viewing a film of oil supported on water. The phenomena accounting for these different colors has long been well known and is occasioned by interference and/or reinforcement occurring between portions of light reflected from the outer end interior surfaces of film 31. Since this phenomena is well known to persons skilled in light and optical phenomena, it will be described only briefly here.

Referring to FIGURE 3, two light rays 35, 36 lying parallel to one another are shown impinging on film 31 substantially but not quite normally to a particular area thereof. By far the major portion of each ray passes through both of films 31, 32 and impinges upon the black surface of sphere 26 where they are absorved. However, a small portion, as 5%, of each ray is reflected by the inner and outer surfaces respectively of film 31.

Depending upon the thickness of film 31 at the point of contact by the incident light, the ray of light reflected from interface 30 may be sufficiently out of phase with the reflected ray from the outer surface as to provide either so called reinforced or bright color, or an interference or dark color. Film thicknesses providing reinforced or bright colors are represented by the expression:

$$X = \frac{n\lambda}{4u}$$

where

X equals the thickness of film 31 in Angstrom units;
$\mu$ is the refractive index of the film;
$\lambda$ is the wave length of the incident light in Angstrom units; and
$n$ equals 1, 3, 5, 7, 9.

The thickness of film 31 providing interference or dark colors is represented by:

$$X = \frac{n\lambda}{4\mu}$$

where the symbols represent the same values as above except that $n$ equals 0, 2, 4, 6, 8.

For convenience the series of bright colors closely associated with one another and wherein $n$ equals any one of the numbers 3, 5, 7 or 9 are hereinafter referred as bright colors respectively of the 3rd, 5th, 7th, or 9th spectral order. These particular series of reinforced or bright colors are readily observed and identified by the human eye and are the ones most conveniently utilized in accordance with the principles of this invention.

Desirably, the active film of sensor material is isothermal in nature, there being very little temperature change across the active film. For this reason it will be recognized that the sensor film exhibits characteristics corresponding to those of a thin film thermocouple.

Referring now to FIGURE 4, there is shown a readout chart or device by which the series of colors characteristic of the 3rd, 5th, 7th and 9th spectral orders are plotted on respective inclined lines extending crosswise of the chart and inclined upwardly toward the right. Arranged crosswise of the lower edge of the chart are the wavelengths of light within the range of 4000 to 65000 Angstrom units.

The right hand margin of FIGURE 4 shows the actual calibrated film thickness in Angstrom units. These calibrations were performed by means of ellipseometer readings of an index of refraction of 1.5.

The left hand margin has a first scale showing the actual surface temperature measured and a second showing the ratios of heat transfer measured relative to a heat transfer at the start of the silver color of 1.

The left hand margin of the readout chart has an inner scale representing temperatures in degrees Fahrenheit and extending over a range of 150 to in excess of 2400 degrees. A second scale represents heat transfer rates.

The principal colors characteristic of the different spectral orders and the associated wave length is set forth in the following table:

| Spectral Order | Wave Length | | | | |
| --- | --- | --- | --- | --- | --- |
| | 4,050 A. | 4,625 A. | 5,350 A. | 5,850 A. | 6,400 A. |
| 3 | Silver violet | Blue | Green gold | Yellow gold | Red. |
| 5 | Blue violet | Deep hue | Bright green | Bright yellow | Bright red. |
| 7 | Violet purple | Blue purple | | | |
| 9 | Dark purple | | | | |

The colors typical of the 3rd spectral order are also imprinted across the bottom of FIG. 4 whereas the corresponding colors for the 5th, 7th, and 9th spectral orders are set forth in the above table and are respectively represented by the points of intersection of the vertical series of color lines with the 5th, 7th and 9th spectral order lines. In other words, let it be assumed that the observer viewing a particular point on the surface of coating after exposure to a heat run identifies the color as deep blue. The table indicates this color occurs in the 5th spectral order and corresponds to a film thickness wave length of 4000 Angstrom units. This point on the chart corresponds to the lower end of the 5th spectral order line. From this information, the observer quickly refers horizontally to the left and reads off the corresponding surface temperature and the heat transfer rate. By the same procedure, the readout conditions for any point on the surface of a model exposed to a pulse of heat of a known intensity and duration can be had using the color table in conjunction with the graphic chart of FIGURE 4 in the manner just described.

Although the foregoing discussion of the underlying principles of the present invention have been directed largely to the use of relatively thin films of heat sensor material, it will be understood that the same results are obtainable using much greater thicknesses of these same heat sensor materials where exposure to heat for a much greater period is feasible. The interface between the layer having a modified refractive index and that having an unchanged index has a readily observed distinctive appearance. For this reason, it is relatively simple to make accurate measurements of the depth or thickness of the layer having a modified refractive index. With this information and the known temperature of the heat source and the measured time of exposure to this heat source, the technician can readily determine the heat transfer rate and surface temperature. Measurements of the exposed layer are made normal to the exposed surface and preferably by cutting through the sensor material in an area to be measured.

In view of the foregoing it will be understood that relatively thick-walled heat sensors may be employed to advantage in a great variety of industrial applications. Layers of the requisite thickness of the sensor material are positioned in the zone under observation with one surface facing the heat source. It will be understood that any heat source may be employed capable of producing 50 B.t.u. per square foot per second for a period in excess of the period selected for the test run. Examples of heat source include blowtorches, lasers, hypersonic wind tunnels and many others.

While the particular method of determining heat transfer rates and temperature conditions herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:

1. That method of determining heat transfer rate characteristics of an object which comprises, applying a layer of transparent heat sensor material to the surface of the object on the side thereof exposed to a source of heat, said heat sensor material being one which changes its index of refraction in response to heat and beginning on the surface adjacent the heat source and advancing progressively through the thickness of the layer as a function of the duration of exposure to the heat source, exposing said object and its layer of transparent material to a source of heat for a predetermined period, and thereafter measuring the depth of said layer the refractive index of which has been changed by exposure to the heat for comparison with calibration heat transfer rate data.

2. That method of determining the heat transfer rate characteristics of an object which comprises, applying a layer of transparent heat sensor material to the surface of the object on the side thereof exposed to a source of heat, said heat sensor material being one which changes its index of refraction in response to heat and beginning on the surface adjacent the heat source and advancing progressively through the thickness of the layer as a function of the duration of exposure to the heat source, exposing said object and its layer of transparent material to a source of heat for a predetermined period, and cutting through said layer normal to the exterior surface thereof in portions thereof in which the heat transfer rate is desired, measuring the depth of the outer portion of the layer having its refractive index changed by exposure to the source of heat, and comparing said depth with calibration data of heat transfer rates.

3. That method of determining heat transfer rates on the surface of an object which comprises applying a film of heat sensor material to the blackened surface of the object, subjecting said object to a momentary pulse of heat adequate to effect a change in the optical characteristics of said heat sensor film and causing the same to refract light and create colors each indicative of the extent of the change in said plastic film produced by said heat pulse, and optically determining the characteristic color of different portions of the object surface for comparison with calibration data of predetermined heat transfer rate values.

4. That method of visually determining heat transfer rate characteristics of contiguous surface areas of an object which method comprises, blackening the object surface to render the same substantially nonreflecting to light, coating the blackened surface with a film of translucent heat sensor material having the capability of changing its light refracting properties in response to exposure to heat, exposing said film to a pulse of heat of known value and duration to cause a change in said film to a depth less than the thickness thereof, and observing the colors of said plastic film characteristic of changes produced by said heat pulse in contiguous areas thereof for comparison with calibration colors of predetermined known heat transfer rate values.

5. That method of determining the effects of a heat source on different areas of an object exposed to heat which method comprises, applying a layer of material to the object having a light-absorbing interior base and a translucent exterior film of heat sensor having the property of changing its light refracting properties in response to the quantity of heat to which said film is exposed, exposing said object to heat for a sufficient period to change the light refracting characteristics of said translucent film to a depth not in excess of the film thickness, observing the characteristic colors of different surface areas of said film when exposed to light and any two of which colors are known to represent predetermined differences in heat transfer rates.

6. That method of conducting heat transfer rate evaluation studies of a spacecraft design which method comprises using a scale model of the proposed spacecraft, coating the same with a uniform layer of a coating having a light absorbing base adherent to the model surface and a transparent outer film of heat sensor material the refractive index of which changes abruptly on exposure to heat from its exterior surface toward its interior junction with its said light absorbing base, supporting said coated spacecraft in a hypersonic wind tunnel, operating said tunnel for a predetermined instant to expose said spacecraft to a high velocity stream of heated gas effective to change the refractive index of said coating to varying depths in different areas thereof, and thereafter measuring the depth of refractive index change in said transparent film in all areas of interest and comparing said depths with appropriate calibration data.

7. That method defined in claim 6 characterized in the steps of similarly coating a sphere to the same depth with the same heat sensor material used to coat said model spacecraft, supporting said coated sphere in said wind tunnel laterally to one side of said spacecraft and so as to be subject to the same test conditions as said spacecraft, optically examining the colors visible on the surface of said model spacecraft after the test run of said tunnel and each color of which is indicative of a different heat transfer rate, and comparing the colors found in different aeras of said spacecraft with an identical color found on said sphere and known to represent a specified precalibrated heat transfer rate.

8. That method of conducting heat transfer rate tests which comprises employing a layer of heat sensor material of a type having the property of changing its refractive index progressively inwardly from the side thereof exposed to a heat source, exposing one surface of said heat sensor material to a heat source for a predetermined period of time, and determining the heat transfer rate by measuring the thickness of the layer having a modified refractive index and comparing the results with calibration data for that specific heat sensor material.

9. That method of conducting heat transfer tests on a structure being designed for operation above the earth's surface which method comprises, applying a film layer of substantially clear heat sensor material to the darkened surfaces of structure to be tested and having the property of changing its optical properties progressively from its exterior surface when exposed momentarily to a heat source simulating actual operating conditions above the earth, supporting the prepared structure in a hypersonic wind tunnel and operating said tunnel at a predetermined rate and period, and thereafter visually analyzing the portion of said film having changed optical properties and comparing the observed results with a calibration sphere coated with said heat sensor material and exposed to the same test conditions as said structure.

References Cited by the Examiner
UNITED STATES PATENTS

| | | | |
|---|---|---|---|
| 2,928,791 | 3/1960 | Loconti | 73—356 X |
| 2,998,720 | 9/1961 | Williams et al. | 73—15 |
| 2,998,745 | 9/1961 | McClellan | 88—14 |

DAVID SCHONBERG, *Acting Primary Examiner.*

LOUIS R. PRINCE, *Examiner.*